(12) United States Patent
Driegen et al.

(10) Patent No.: US 10,769,806 B2
(45) Date of Patent: *Sep. 8, 2020

(54) DIMENSIONAL ACQUISITION OF PACKAGES

(71) Applicant: Logical Turn Services, Inc., Markham (CA)

(72) Inventors: Paul Driegen, Markham (CA); Adam Stevenson, Markham (CA); Kirk Serjeantson, Markham (CA); David Short, Markham (CA); Michael Hagler, West Hempstead, NY (US); Thibaut Tiberghien, Skudai Johor (MY); Ian Gartley, Markham (CA); Andrea Winarski, Markham (CA)

( * ) Notice: Subject to any disclaimer, the term of this patent is extended or adjusted under 35 U.S.C. 154(b) by 91 days.

This patent is subject to a terminal disclaimer.

(21) Appl. No.: 15/903,979

(22) Filed: Feb. 23, 2018

(65) Prior Publication Data
US 2018/0253857 A1  Sep. 6, 2018

Related U.S. Application Data

(63) Continuation-in-part of application No. 15/276,145, filed on Sep. 26, 2016, now Pat. No. 10,096,131.

(60) Provisional application No. 62/233,035, filed on Sep. 25, 2015.

(51) Int. Cl.
*G06T 7/62* (2017.01)
*G06T 7/80* (2017.01)

(52) U.S. Cl.
CPC .............. *G06T 7/62* (2017.01); *G06T 7/85* (2017.01); *G06T 2200/04* (2013.01); *G06T 2207/10028* (2013.01); *G06T 2207/20032* (2013.01)

(58) Field of Classification Search
CPC .... G06T 7/60; G06T 7/62; G06T 7/85; G06T 3/60; G06T 2207/20221; G06T 2207/10016; G06T 2200/04; G06T 2207/20032; G06T 2207/10028
See application file for complete search history.

(56) References Cited

U.S. PATENT DOCUMENTS

| 8,411,080 B1 * | 4/2013 | Zimmermann | G06T 19/20 345/419 |
|---|---|---|---|
| 9,117,281 B2 * | 8/2015 | Hoiem | G06K 9/46 |
| 9,268,407 B1 * | 2/2016 | Noble | G06F 3/0488 |
| 9,779,276 B2 * | 10/2017 | Todeschini | G06K 7/10732 |
| 10,262,431 B2 * | 4/2019 | Tabuchi | G06T 7/62 |
| 2003/0167229 A1 * | 9/2003 | Ludwig | G06Q 20/102 705/40 |
| 2011/0211749 A1 * | 9/2011 | Tan | G06T 7/11 382/154 |
| 2015/0063681 A1 * | 3/2015 | Bhardwaj | G06K 9/00208 382/154 |
| 2015/0123973 A1 * | 5/2015 | Larsen | G06T 15/04 345/427 |
| 2015/0138310 A1 * | 5/2015 | Fan | G06K 9/00201 348/36 |

(Continued)

*Primary Examiner* — Ming Y Hon
(74) *Attorney, Agent, or Firm* — Taft Stettinius & Hollister LLP

(57) ABSTRACT

The present disclosure relates to calculating dimensions of loaded or partially loaded pallets for purposes of billing. A plurality of cameras are utilized to determine dimensions of a package placed in bounding volume for shipping.

18 Claims, 19 Drawing Sheets

(56) References Cited

U.S. PATENT DOCUMENTS

| | | | | |
|---|---|---|---|---|
| 2015/0219437 A1* | 8/2015 | Dowski | ............... | G01S 5/16 |
| | | | | 701/1 |
| 2015/0279016 A1* | 10/2015 | Kim | ............... | G06T 7/80 |
| | | | | 382/154 |
| 2015/0302594 A1* | 10/2015 | Moore | ............... | G01B 11/25 |
| | | | | 348/47 |
| 2015/0325038 A1* | 11/2015 | Baker | ............... | G06T 15/205 |
| | | | | 345/426 |
| 2015/0326845 A1* | 11/2015 | Liang | ............... | G06T 7/11 |
| | | | | 382/154 |
| 2017/0076459 A1* | 3/2017 | Plowman | ............... | G06T 7/579 |
| 2017/0221226 A1* | 8/2017 | Shen | ............... | G06T 7/80 |

* cited by examiner

DIMENSIONAL ACQUISITION OF PACKAGES

CROSS-REFERENCE TO RELATED APPLICATIONS

This application claims priority from U.S. Provisional Application No. 62/233,035 filed Sep. 25, 2015, the entirety of which is hereby incorporated by reference in its entirety for all purposes.

TECHNICAL FIELD

The present disclosure relates to calculating dimensions of objects such as packages on loaded or partially loaded pallets for purposes of billing in shipping and transportation applications.

BACKGROUND

In the transportation industry companies charge customers by volume (derived by dimensions—L×W×H), so there is a desire to understand the physical dimensions of each object being shipped. Without automation, these dimensions are calculated manually using conventional methods.

On the market today there are no regulatory approved systems that are cost effective for box freight or skidded freight. Laser-based dimensioners are expensive and complex. They require elaborate framing and the use of specially trained technicians to calibrate. There are also mechanical moving parts that are subject to wear and tear.

Ultrasonic sensors are less expensive but are also less accurate. It is required to manually place the parcel in a very specific location for dimensioning, lowering productivity. Because of the way they work, ultrasonic sensors cannot determine how "cubic" a shape is.

Prior attempts to develop ways of determining shipping volumes are more expensive, require more elaborate framing for their sensors and they cannot distinguish between objects. For example, they may not allow dimension on a forklift and remove its volume from the calculation.

There is therefore a need to provide a low cost product for determining volume of an object that is equal to or better than other higher cost solutions.

SUMMARY

One embodiment of the present disclosure is a method of dimensioning an object for determining shipping volumes, the method comprising: retrieving a plurality of depth maps of an object placed on a dimensioning surface from one or more depth-sensing imaging devices; filtering each of the plurality of depth maps retrieved from the one or more depth-sensing imaging devices; transforming each depth map into a world co-ordinate system in three dimensional space utilizing calibration parameters of each of the one or more depth-sensing imaging devices; generating a point cloud representing the object to be dimensioned using the transformation of the plurality of depth maps; determining edge lengths of the object; determining a height of the object; and calculating a volume of the pallet.

Another embodiment of the present disclosure is a system for dimensioning an object for determining shipping volumes, the system comprising: one or more imaging devices configured to generate a depth map of an object; one or more processors each coupled to a respective imaging device of the one or more imaging devices, the processors for controlling the imaging devices; and a host processor coupled to the one or more processors each coupled to a respective imaging device, the host processor configured to: retrieve a plurality of depth maps of an object placed on a dimensioning surface from one or more depth-sensing imaging devices; filtering each of the plurality of depth maps retrieved from the one or more depth-sensing imaging devices; transform each depth map into a world co-ordinate system in three dimensional space utilizing calibration parameters of each of the one or more depth-sensing imaging devices; generate a point cloud representing the object to be dimensioned using the transformation of the plurality of depth maps; determine edge lengths of the object; determine a height of the object; and calculate a volume of the object.

Yet a further embodiment of the present disclosure is a non-transitory computer readable memory storing instructions, which when executed by a processor of a computing system configure the computing system to: retrieve a plurality of depth maps of an object placed on a dimensioning surface from one or more depth-sensing imaging devices; filtering each of the plurality of depth maps retrieved from the one or more depth-sensing imaging devices; transform each depth map into a world co-ordinate system in three dimensional space utilizing calibration parameters of each of the one or more depth-sensing imaging devices; generate a point cloud representing the object to be dimensioned using the transformation of the plurality of depth maps; determine edge lengths of the object; determine a height of the object; and calculate a volume of the object.

Other aspects and features will become apparent to those ordinarily skilled in the art upon review of the following description of specific embodiments of the disclosure in conjunction with the accompanying figures.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
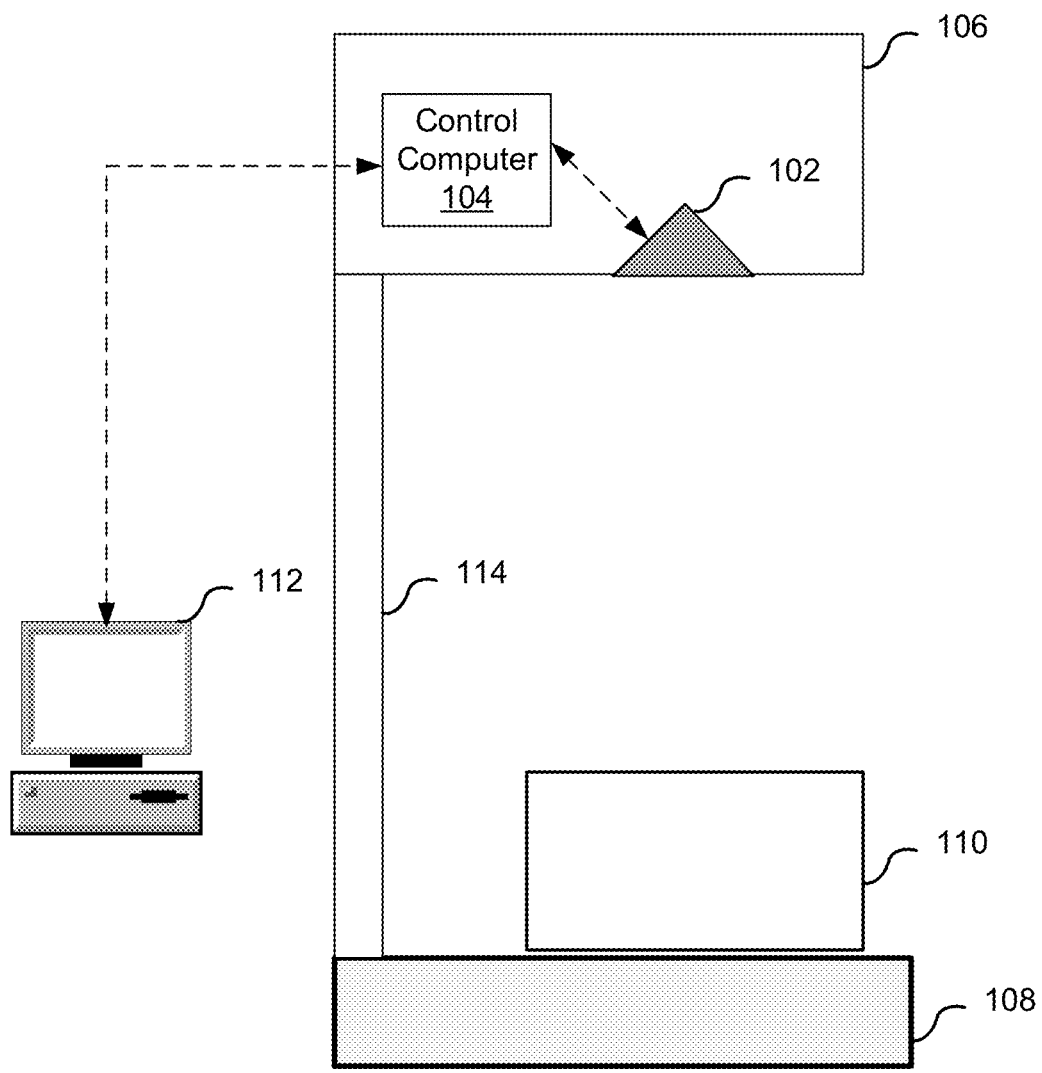
FIG. 1 shows a representation of the dimensioning system in accordance with an embodiment of the present disclosure.

The following description is presented to enable a person skilled in the art to make and use the disclosure, and is provided in the context of a particular application and its requirements. Various modifications to the disclosed embodiments will be readily apparent to those skilled in the art, and the general principles defined herein may be applied to other embodiments and applications without departing from the scope of the disclosure. Thus, the present disclosure is not intended to be limited to the embodiments provided, but is to be accorded the widest scope consistent with the principles and features disclosed herein.

Embodiments are described below, by way of example only, with reference to FIGS. 1-18.

The disclosed system leverages different technology that allows for determination of the volume of objects. For the transportation industry the disclosed system permits various options for dimensioning pallets, including, but not limited to:

- Using a forklift to drop the pallet like other solutions on the market today
- Being able to dimension pallets without dropping the pallet by dimension the entire object but recognizing the forklift and removing it from the volume calculation
- Driving a forklift through a tunnel of sensors to acquire dimensions (same as above but in motion)
- Mounting the sensors to the forklift to acquire dimensions The system disclosed captures real-world dimensions of a physical object such as a package using one or more depth sensing cameras for example ranging, infrared laser and CMOS sensor, flash lidar, time-of-flight (ToF), and RGB-D cameras. A depth-sensing camera is one capable of generating a depth map of the scene to which it is oriented. A depth map is a bitmap data structure, where a bitmap is a type of memory organization used to store digital images. It can be thought of as a matrix where the height and width are equal to the dimensions of the digital image.

When dealing with color images, each element of the matrix represents the color of the pixel at that position. A depth camera generates bitmaps exactly as a color camera does, except each element of the resultant bitmap contains a depth value representing the distance of that element from the camera rather than a color.

There are multiple existing techniques being used in depth sensing cameras today to create depth maps such as for example Microsoft™ Kinect™ v2 sensor. It uses a sophisticated infrared (IR) technique to generate depth maps at 512×424 resolution at 30 frames/second. Stereoscopic camera system such as one offered by Stereolabs™ may be utilized which can also generate depth maps in real time using a completely different technique.

The main difference between the two is the technology used to create the depth map. As mentioned the Kinect sensor uses an infrared (IR) technique, whereas a stereoscopic camera uses multiple cameras to capture stereo images and computes depth based on the deltas between the left and right images. A major advantage of the IR based solution is that it is not dependent on ambient light like a standard camera system would be. However, IR based cameras suffer from some limitations of IR, namely that it reflects poorly from certain surfaces (i.e. glossy black surfaces).

The methods and systems described herein may be implemented using depth sensing cameras such as either IR based cameras or stereoscopic cameras. Whenever the term "camera" is referenced, it is referring to any depth sensing imaging device capable of meeting our accuracy requirements.

FIG. 1 shows a representation of the dimensioning system using an exemplary case of a single imaging device setup 100 having only a single camera 102. The camera 102 is connected to a control computer 104 executing dimensioning software stored in memory and executed by a processor capable of calculating the object dimensions. Optionally, the control computer 104 is connected to a serial-port weigh scale integrated with the dimensioning surface 108.

One or more cameras 102 are mounted within an enclosure 106 connected to a frame 114, the enclosure 106 is positioned overhead of the flat dimensioning surface 108. If a scale is used, the scale can be used as the dimensioning surface; otherwise any flat surface can be used. The object 110 to be dimensioned is placed on the dimensioning surface 108 and the software on the control computer 104 calculates the object 110 dimensions. The dimensions then appear on a connected output display 112 (monitor), connect to the control computer 104 either directly or through a network.

Custom software running on the control computer 104 retrieves the depth map from the camera 102 and creates a 3D reconstruction of the scene by calculating a 3D transformation of the depth maps. This reconstruction is referred to as a point cloud.

The point cloud is analysed to locate the object and calculate its dimensions (length/width/height) within 0.2 inches. The control computer 104 is capable utilizing a number of different configuration parameters that determine its behaviour. These include:

- Calculating average or maximum height of an object
- Calculating average or maximum edge lengths (length/width) of an object
- Static/Dynamic tolerances for determining how "cuboidal" an object is.

In an embodiment of the present subject matter, the object being dimensioned may also be scanned by a barcode reader or the camera itself to determine shipping information of the object such as the destination, recipient, etc. Once the volume of the object is determined, the volume can be associated with this shipping information to assist with billing systems are associated with a pallet that the package or objects are to be associated with.

Figure 2:
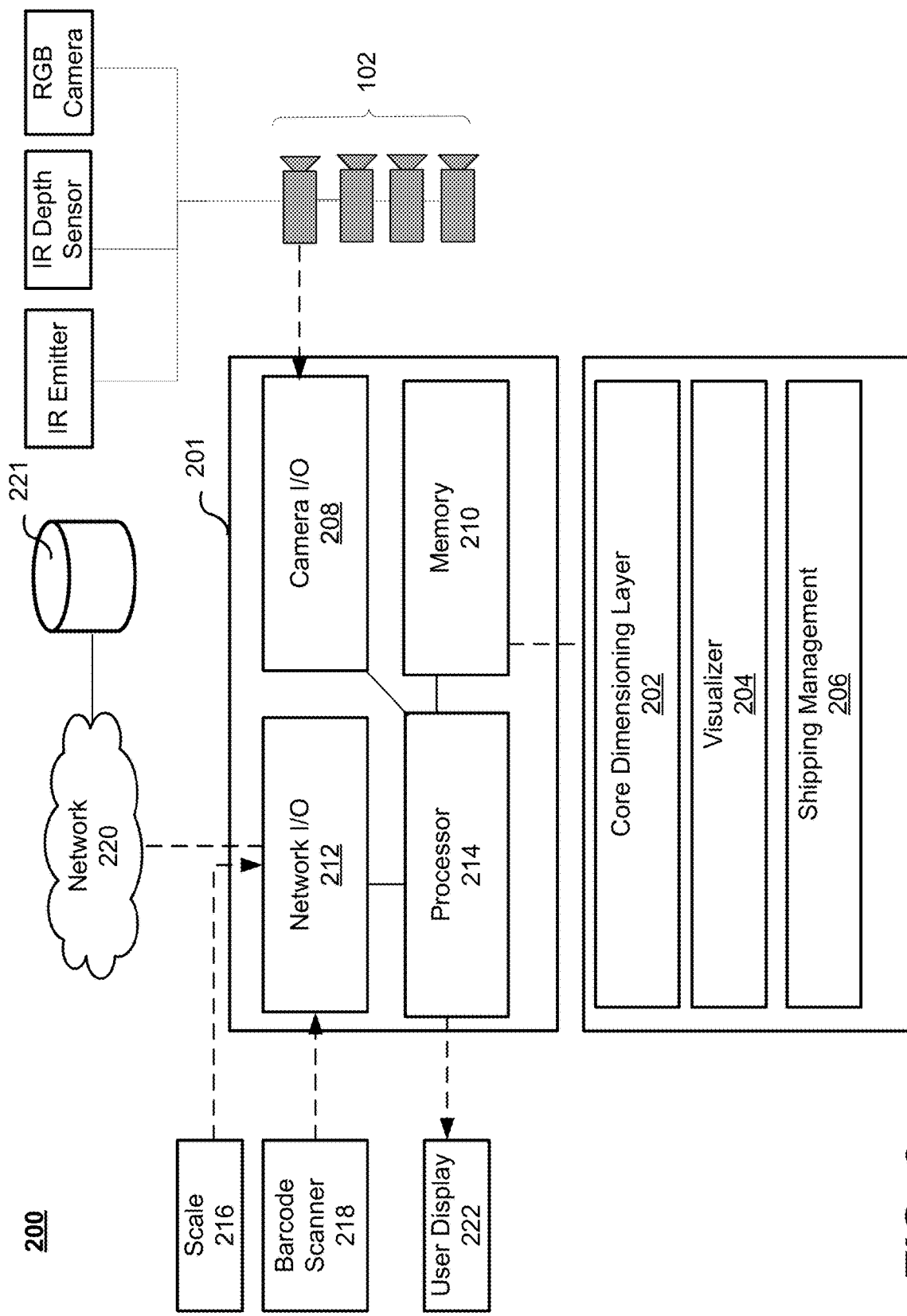
FIG. 2 shows a representation of the hardware and software architecture of the dimensioning system.

FIG. 2 shows a representation of the hardware and software architecture of the dimensioning system 200. The dimensioning system has a controller 201 comprises a processor 214 configured to interface with a memory component 210, a network component 212, a camera input component 208, and a display interface 222. The processor may be configured to receive camera depth maps from each sensor 102. The memory unit 210 may comprise a software-modified physical memory configured to receive the camera depth maps and dimension the object. A visualizer component 204 within the software-modified physical memory may be configured to receive the plurality of depth maps and create a combined point cloud. A core dimensioning layer 202 within the software-modified physical memory may be configured to calibrate and dimension the object using the combined point cloud. A shipping management system 206 within the software-modified physical memory may be configured to receive and compare shipping information unique to the object with the dimension information obtained. The network component may be configured to receive the weight of an object from the scale 216. In addition, the network component may be configured to receive a unique identifier obtained from a barcode scanner 218 scanning the object. Other identification methods such as for example RFID may be used to identify the object or the dimensioning cameras may be utilized. An RFID tag may be attached to the object and a RFID passive or active reader placed in proximity to the dimensioning system. The network component may access shipping information corresponding to the unique identifier from a database 221 stored remotely through network 220. The processor 214 is configured to interface between the network component and the memory component 210. Dimension and shipping information computed from the memory unit 210 may be used to generate a report for the user. The report may be outputted on a display interface and stored in a database on a network on the cloud.

In addition to the single imaging device setup 100 shown in FIG. 1, where a single depth camera is mounted overhead of a flat dimensioning surface oriented so that it is exactly perpendicular to the surface, this may not be suitable for larger objects so a multi-sensor camera configuration may be used.

Figure 3:
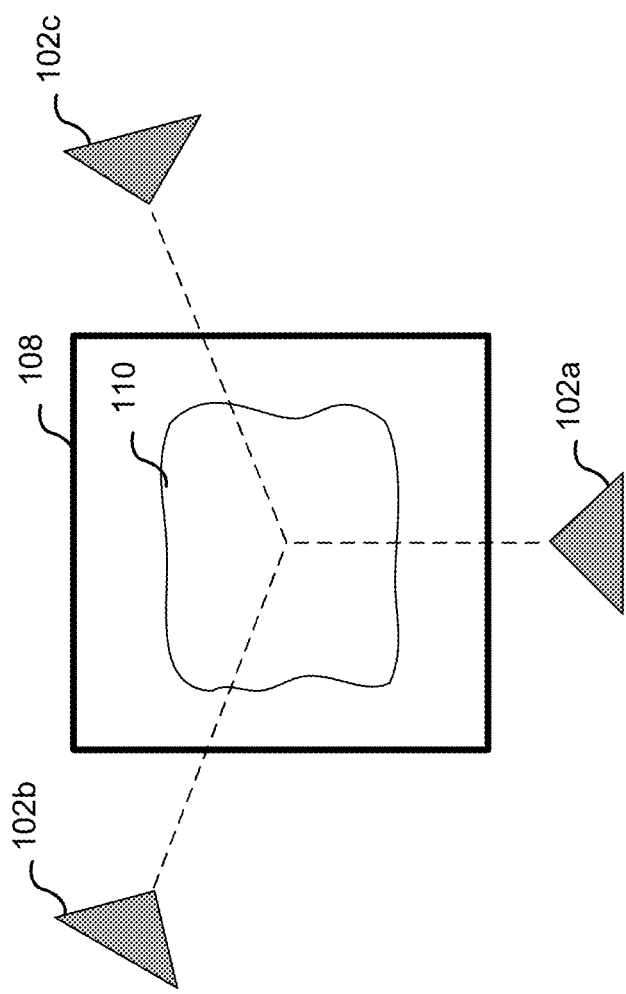
FIG. 3 shows a top view of multi-imaging device configuration.

FIG. 3 shows a top view of multi-imaging device configuration. A multiple sensor setup where two or three cameras, 102a, 102b, 102c, are mounted at orientations that surround the object to be dimensioned 110 may be considered. The cameras 102a, 102b, 102c, are positioned above the dimensioning surface 108 and slightly offset from center, oriented so that each is aiming directly at the center of dimensioning surface 108 to surround the object 110 to be measured.

Figure 4:
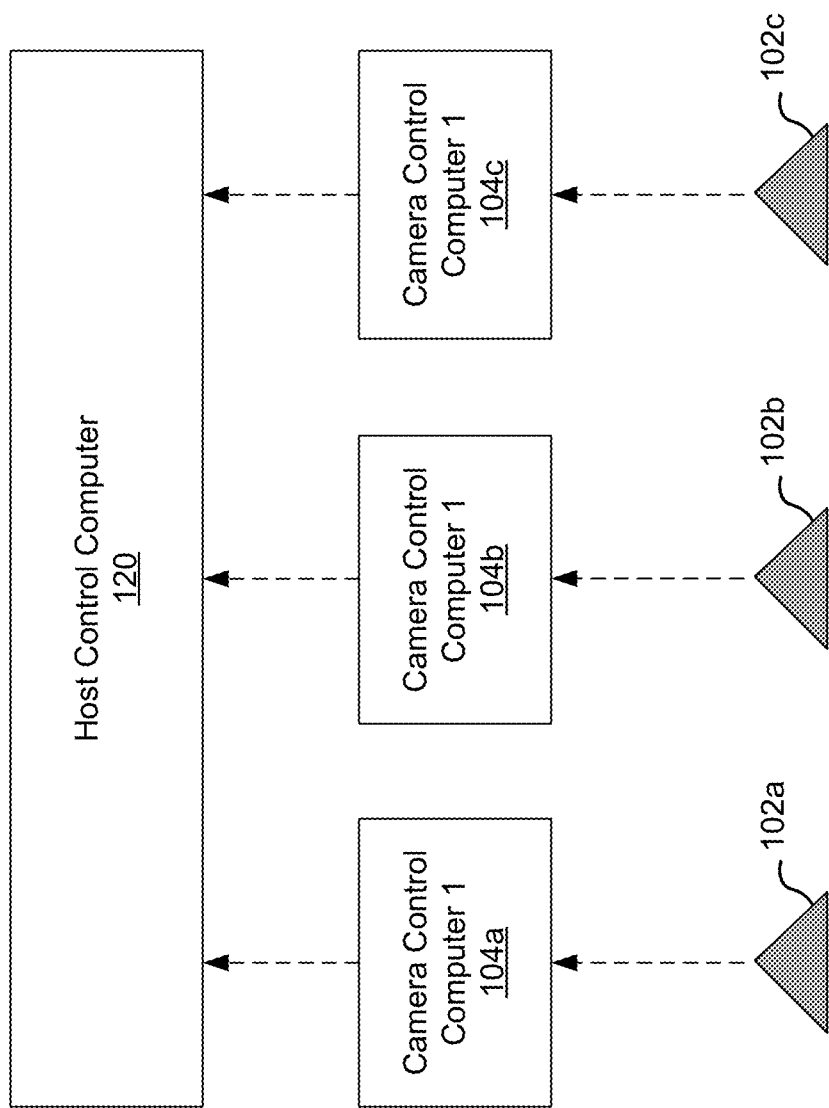
FIG. 4 shows hardware required in a multi-imaging device setup.

FIG. 4 shows hardware required in a multi-imaging device setup. Note that in a multi-sensor setup each camera 102a, 102b, 102c, may have its own dedicated control computer 104a, 104b, 104c. Each of the control computers 104a, 104b, 104c forward on the captured depth maps to the host control computer 120, which will perform the necessary dimensioning calculations. In the case of a single imaging device as shown in FIG. 1, the camera 102 is still connected to the control computer 104. This control computer 104 may carry out the object dimensioning, or may still forward the captured depth maps to a separate host control computer 120.

In an embodiment of the present subject matter, each sensor is connected to a dedicated control computer with a dedicated software agent. The host control computer is connected to a master agent which requests point cloud data from the dedicated software agents. In addition, the master agent ensures that the dedicated software agents will not emit infrared signals simultaneously. This is to ensure that infrared interference does not occur. Also, the master agent requests a license key from each dedicated software agent at each scan. The dedicated software agent will generate a license key using each dedicated control computer's unique identifier as well as the unique identifier of the sensor they drive. The master agent can verify using the license key that the same dedicated software agent and sensory that have been calibrated are used for subsequent scans. The purpose of the license key is to ensure that the system is protected from malevolent or accidental tempering.

For any type of configuration, the system must be calibrated in order to understand the camera's position and orientation in real-world space. FIG. 5 shows a calibration setup for a single imaging device system. In a single sensor configuration, the camera 102 is mounted directly overhead of the dimensioning surface 108.

The system must determine exactly how much distance lies between the dimensioning surface 108 and the camera 102 in order to find zero plane. It does this by generating depth maps of the dimensioning surface 108 using camera 102, retrieving these depth maps from the camera 102, creating a 3D point cloud from it and attempting to locate geometric planes using a Random Sample Consensus (RANSAC) algorithm. Once a plane has been extracted from the data, it can be used to determine exactly how far the dimensioning surface 108 is from the camera 102.

The exact orientation of the camera 102 relative to the dimensioning surface 108 may also be determined. For the system to be accurate, a vector V extending straight down the Z axis of the camera 102 must be within 1 degree of the plane normal N 130. That is, the dot product of the two vectors (normalized) must be <1 degree. The dot product is given by the following formula:

$$V \cdot N = |V||N|\cos\theta$$

Provided |V| and |N| are both 1 (as V and N are both unit length vectors), the result is simply cos θ, which must be <1 degree.

Figure 5B:
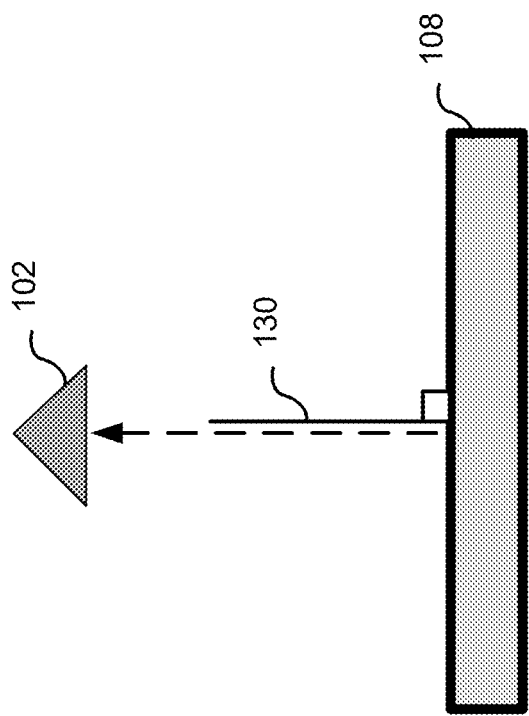
FIGS. 5A and B shows a calibration setup for a single imaging device system.
Figure 5A:
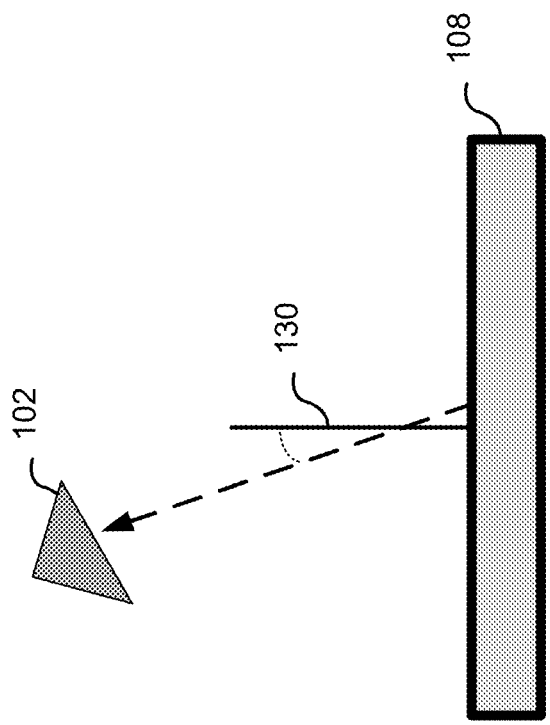

This is shown in FIG. 5, where FIG. 5A shows an incorrect setup calibration for a single camera where the camera 102 is not positioned parallel to the dimensioning surface 108 and is offset from the plane normal N 130. FIG. 5B shows the correct calibration when the camera 102 is parallel to the dimensioning surface and in line with the plane normal N 130.

Figure 6A:
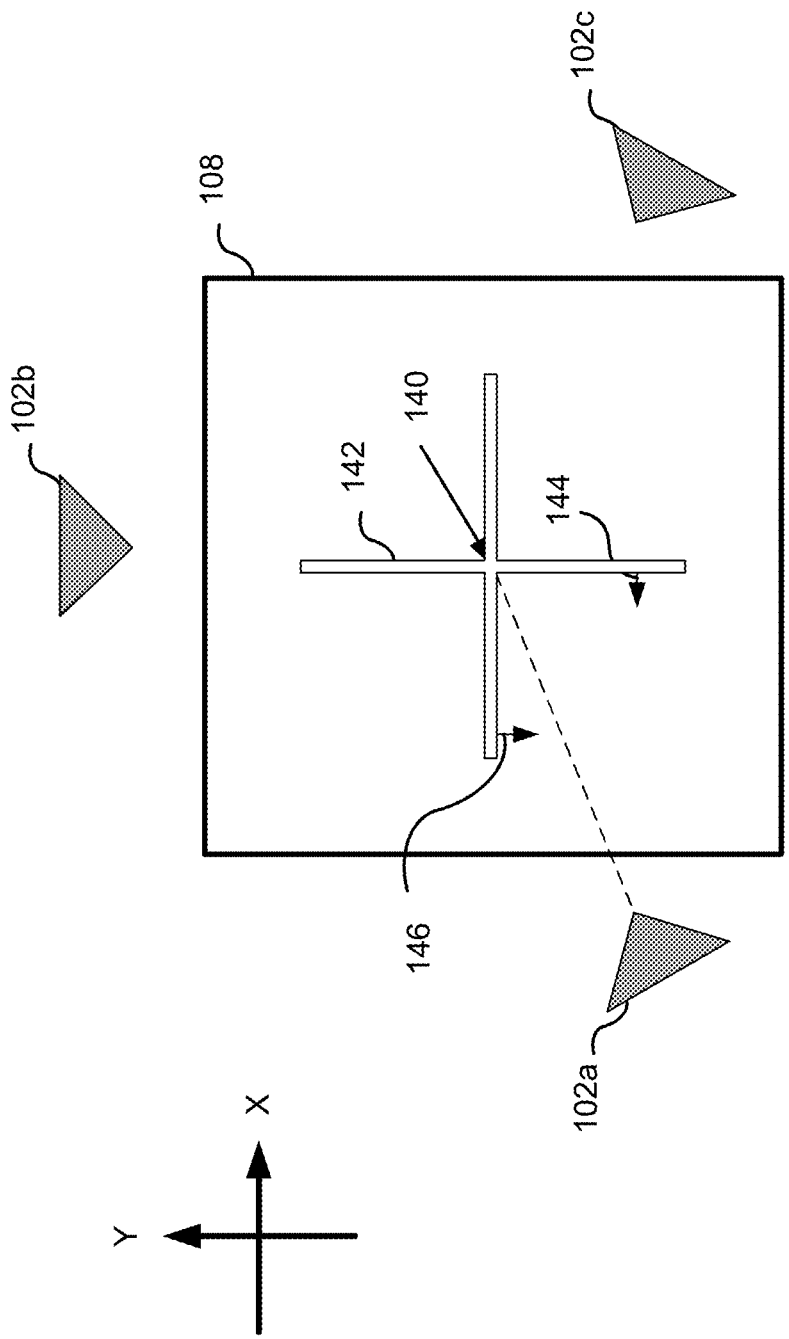
FIGS. 6A and B show a top view and a side view of multi sensor calibration setup respectively.
Figure 6B:
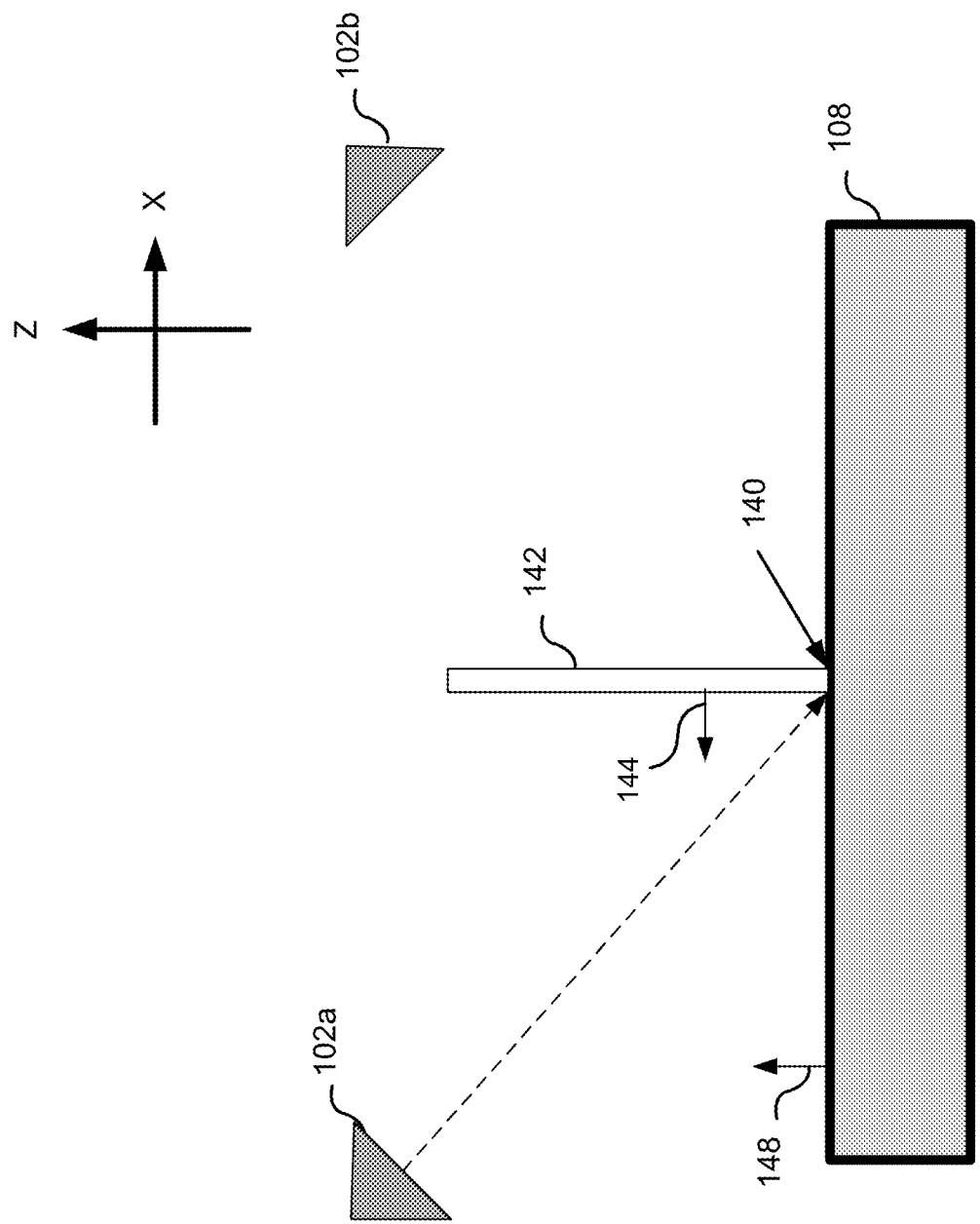

FIGS. 6A and 6B show a top view and a side view of multi-sensor calibration setup respectively. In a multi-sensor configuration, each camera 102a, 102b, 102c, is positioned above and slightly offset from center, oriented such that it is aiming directly at the center of the dimensioning surface 108. In a multi-sensor configuration, the depth map from each camera 102a, 102b, 102c will be combined in by the host control computer 120 to form a combined point cloud as described with respect to FIG. 4. This necessitates that a multiple coordinate system is utilized. The control computer 104a, 104b, 104c attached to each respective camera 102a, 102b, 102c, will process camera data according to local camera space coordinates, but the host control computer 120 that combines data from all cameras 104a, 104b, 104c, must transform each camera's depth map to a world coordinate system. From that point the dimensioning host control computer calculates dimensions from the point cloud similarly to the way it works with a single camera setup.

From a calibration perspective, each camera 102a, 102b, 102c, must be calibrated such that the software is aware of its exact orientation in 3D space (in a world co-ordinate system) relative to the other cameras. The calibration procedure works by having the camera identify the three planes that reside on the world space axes. These three planes should be situated so that they intersect at the world space origin 140. The three plane equations are:

$$X=0$$

$$Y=0$$

$$Z=0$$

For the plane Z=0 (the XY plane), the dimensioning surface 108 is used. The other two planes are visualized using a specially constructed calibration tool 142 that resembles a '+' is placed on the dimensioning surface 108. The '+' shape is important as it represents the intersection of the three orthogonal planes provided by the equations above and represents the world-space origin 140. The normals for the X=0 plane (the y-z plane) 144, the Y=0 plane (the x-z plane) 146, and the Z=0 plane (the x-y plane) 148 are shown in FIGS. 6A and 6B. The calibration tool provides a 3-D structure of at least 18 inches such that it's enclosing rectangle would have edge lengths of 36 inches. It should also be about 36 inches high essentially making it 36 inches cubed. The "plus" or "cross" shape represents the intersection of 2 orthogonal planes in 3D space. The center of the shape is be placed at the position in real world space that represents the coordinate system origin and XYZ axis orientations for the sensors. Each sensor is able to detect these planes and based on the angles it can then determine its own position relative to that object. The host computer 120 utilizes the information from each sensor in order to understand how to transform the point cloud it receives from each one.

The camera 102a is calibrated by having the control computer activate the camera, capture a series of depth maps and within them identify the three geometric planes using an implementation of the RANSAC algorithm.

Figure 7:
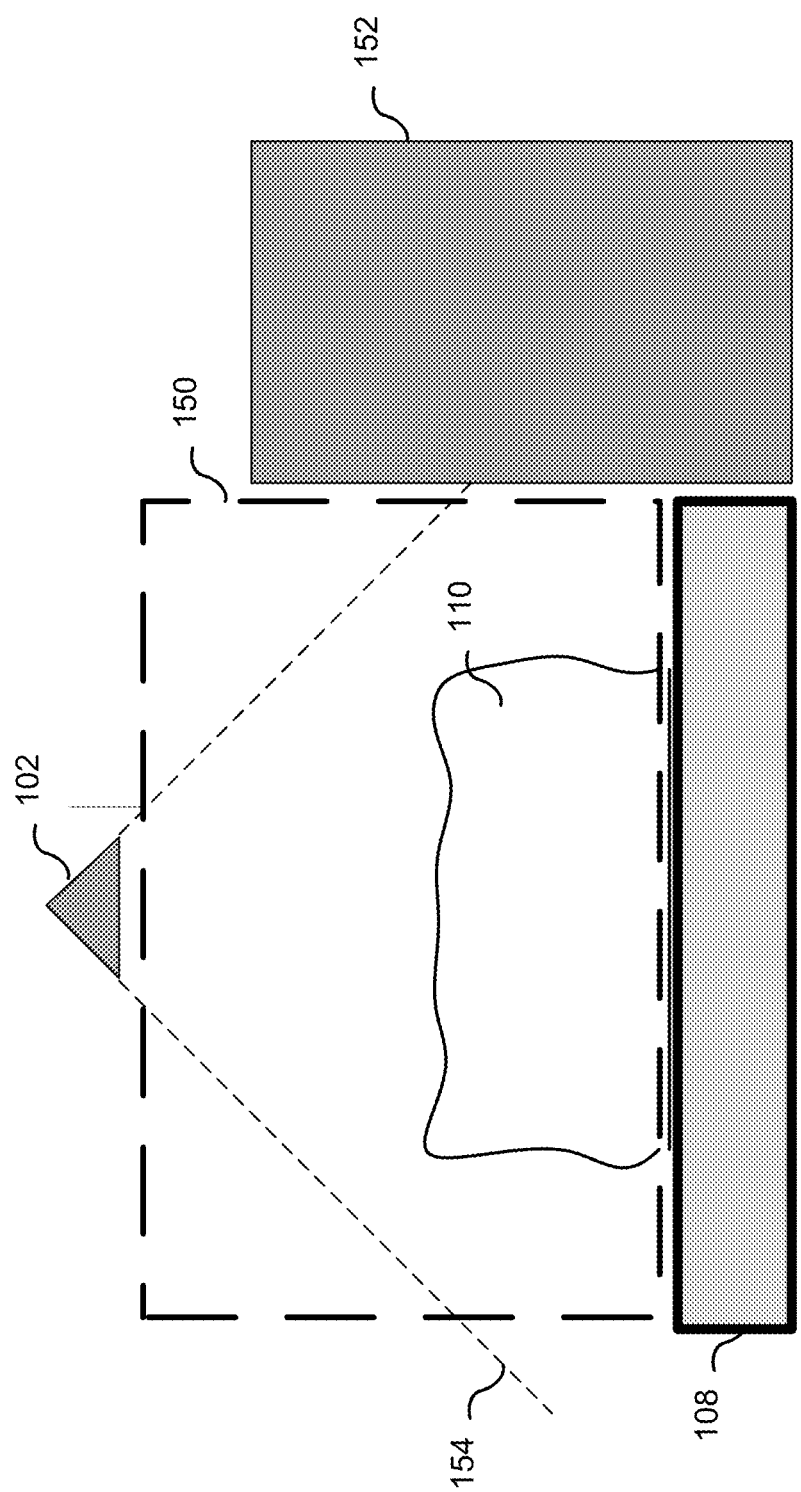
FIG. 7 shows a defined bounding volume.
Figure 8:
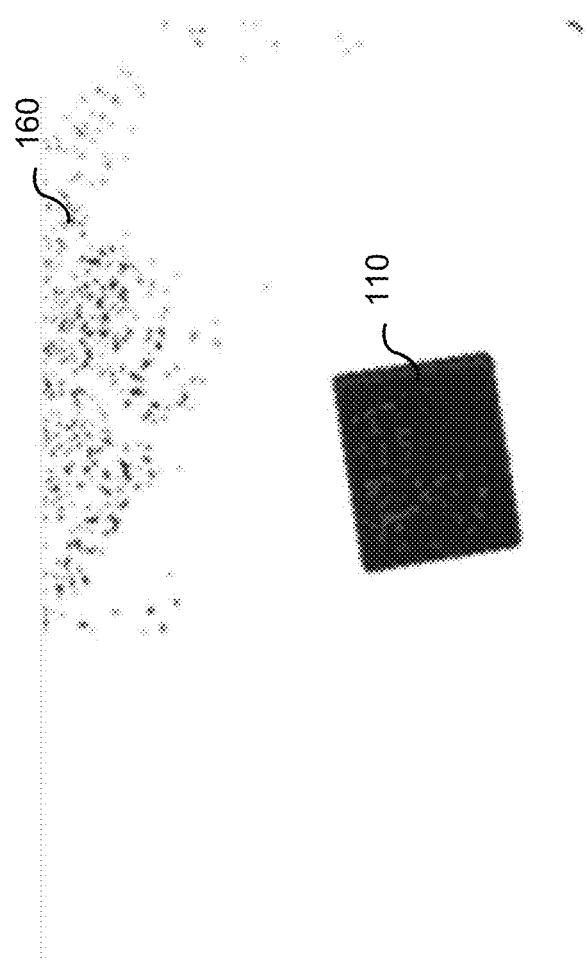
FIGS. 8A and B shows the effect of the median filter.

Provided the calibration tool 142 was oriented to the world-space axes, the software can now determine the distance and orientation of the camera 102a. When all cameras 102a, 102b, 102c, are correctly calibrated the dimensioning software will be able to construct a single point cloud from each of the camera depth maps. In other words, the software can retrieve a depth map taken in a local imaging device space of an imaging camera, and based on the calibration transform the depth map into the world co-ordinate system so that the multiple depth maps from the various cameras can be By default a sensor will capture and process everything within its viewport, including unwanted surrounding objects. Generally, this is not desirable as there may be obstructions or other objects 152 captured in the viewport that are not part of the object to be dimensioned. To overcome this defect, a bounding volume may be used for dimensioning the object. FIG. 7 shows a defined bounding volume 150 in two-dimensions. One of skill in the art will readily be able to apply this concept to higher dimensions.

The bounding volume 150 is a 3D hexahedron aligned to the world co-ordinate system. The software will only consider points that reside inside the bounding volume 150. Accordingly, a surrounding object 152 located within the camera 102 line viewport 154 but outside of the bounding volume 150 would not be considered when determining the volume of the object 110. The bottom plane of the bounding volume 150 should be set to be just above the dimensioning surface 108 to exclude any points residing on the surface itself. It should also be configured so that it is empty when no object 110 is placed on the dimensioning surface 108. When an object 110 is placed on the dimensioning surface 108, every point within the bounding volume 150 can be attributed to the object to be dimensioned 110. In order for an object 110 to be correctly dimensioned, it must be completely contained in the bounding volume 150. The bounding volume 150 may also be adjusted to compensate for a pallet, or may be included in the volume calculation.

FIGS. 8A and 8B shows the effect of a median filter. Once the system is calibrated and configured, dimensioning can occur when an object 110 is placed within the bounding volume 150. A series of depth map frames are retrieved from the camera 102. The exact number of frames to capture is a configuration setting, but a non-limiting example of 6-10 frames typically yields acceptable results. Each frame may be filtered using a Median filter to smooth out grainy outliers in the depth map. FIG. 8A shows a depth map of the object 110 with noise interference 160. FIG. 8B shows a depth map of the object 110 after the median filter has been applied.

The point cloud may be filtered using a kNN approach. A density estimation is conducted by computing the distance between a point and its "k" nearest neighbours for all points in the point cloud. Points having a statistical greater distance to their neighbours are discarded. The discarded points are isolated and have a high probability of coming from sensing artefacts.

An averaging algorithm is applied against all frames to produce a single "moving average" frame. A 3D Transformation of the output frame is created by transforming each point in the frame into 3D space.

In a single camera setup, the world-space coordinate system is setup so that the camera focal point is the world space origin 140. That is, the camera 102 is always aimed at the point 0, 0, and 0 in the world co-ordinates.

In a multi-camera setup, the depth maps from each camera 102a, 102b, 102c, are transformed according to camera calibration parameters determined during the calibration. Based on the relative positions and orientations of the imaging devices 102a, 102b, 102c, the depth maps captured by each of the imaging devices are transformed to generate a single point cloud where every point is defined in the same co-ordinate space, namely the world co-ordinate system. In this case, the world-space origin 140 is defined as being somewhere near the center of the dimensioning surface 108, and all transformation calculations must take this into account. The transformation is performed by applying a reverse transform on the points captured from each camera, where the amount of translation/rotation required is the inverse of each camera's location/orientation. Therefore, the point cloud generated by the multi-camera setup is no different than what is generated by the single camera setup in that a single point cloud is produced in the world co-ordinates, though inherently a different amount of data would be captured by the multi-camera setup than the single camera setup.

Figure 9:
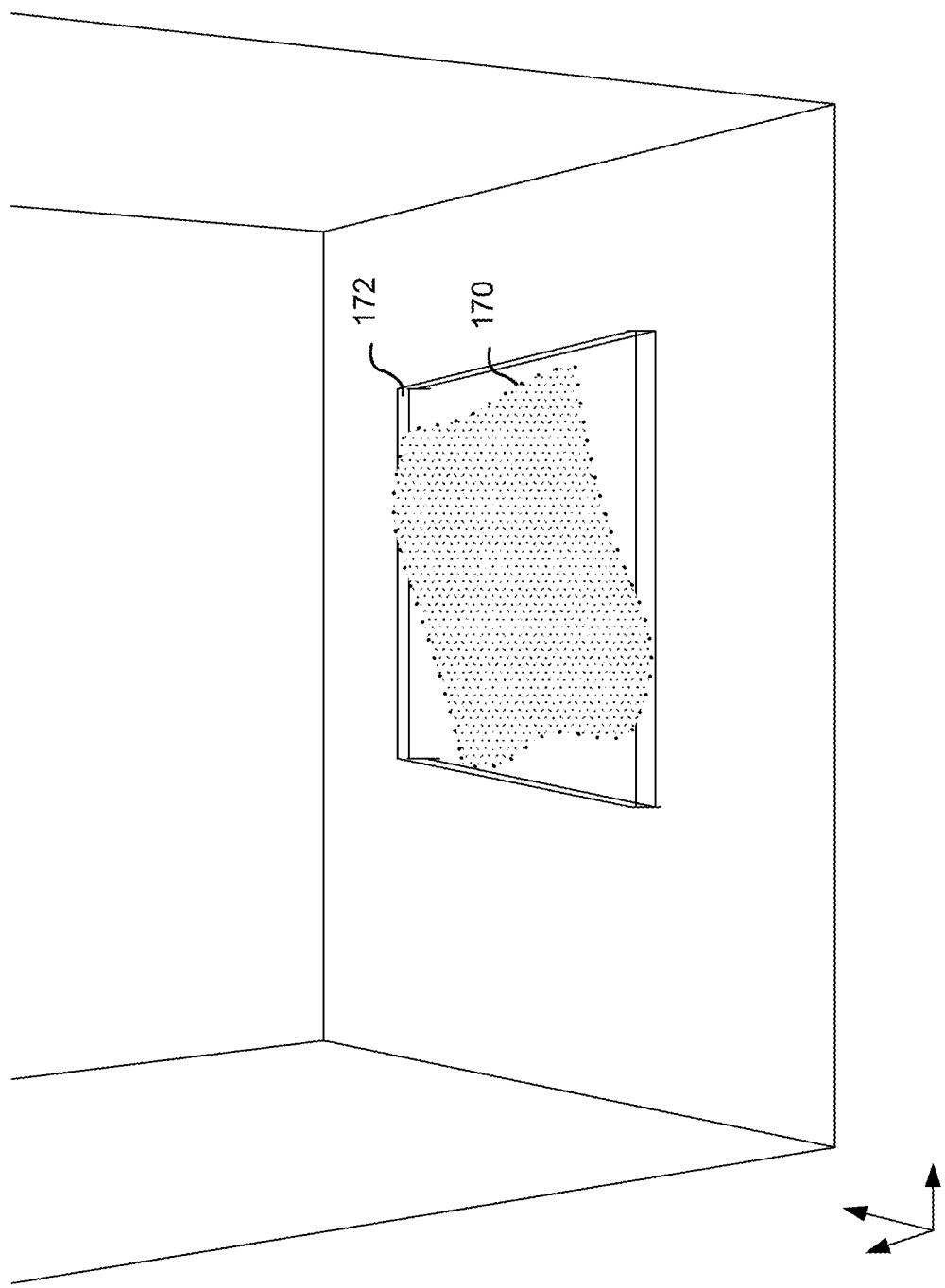
FIG. 9 shows a point cloud representation.

The result forms the point cloud data structure. A visual example of a point cloud 170 representing an object 110 taken from a single imaging device configuration is shown in FIG. 9.

To calculate the overall dimensions and volume of the object 110, it is necessary to calculate the edge lengths of the object 110. The edge lengths are determined by first translating the point cloud to be at the center of the world co-ordinate system, and then using a simplified variant of the "moving callipers" algorithm to determine a minimum volume bounding box 172 of a convex hull. The algorithm entails rotating the point cloud about its center 1 degree at a time from 0 to 90 degrees around the Z axis in the world co-ordinate system. The Z axis is normal to the dimensioning surface 108.

At each rotation interval, a bounding box aligned with axes of the world co-ordinate system is calculated for all points. The area (L×W) of the front face (camera-facing) of the box is captured and compared with the current minimum. If the calculated area at a given rotation angle is less than the current minimum calculated area, this becomes the new minimum. The rotation angle associated with the minimum calculated area bounding box is stored as the object "rotation angle". The front face of the minimum bounding box calculated in above is stored as the bounding rectangle.

The edge lengths of the minimum bounding rectangle calculated above represent the maximum edge lengths (width and length dimensions) of the object. The height of the object 110 can be determined by calculating a first vertical distance between a position in the vertical axis of the world co-ordinate system and the dimensioning surface 108 (which may be determined during calibration), calculating a second vertical distance between the position in the vertical axis of the world co-ordinate system and the front face of the object 110, and then calculating the difference between the first and second vertical distances, the result being the height of the object 110. The position in the vertical axis may be the camera 102 in the single camera setup, or may be in a plane that the cameras 102a, 102b, 102c, are located in for a multi-camera setup. Based on these dimensions, a volume of the object 110 can be calculated as the product of the length, width, and height dimensions of the object determined.

The point cloud may also be analysed to determine variances in height and edge lengths to determine if an object can be considered a cuboid or not. The aggressiveness of the algorithm to calculate if an object is cuboidal can be configured in the software.

Rarely are real-world objects perfectly square or cuboidal. Even parcels that are designed to be hexahedrons will warp and bend slightly when loaded. This section describes how the software can achieve more accurate measurements by using an averaging calculation on all edges.

Figure 10:
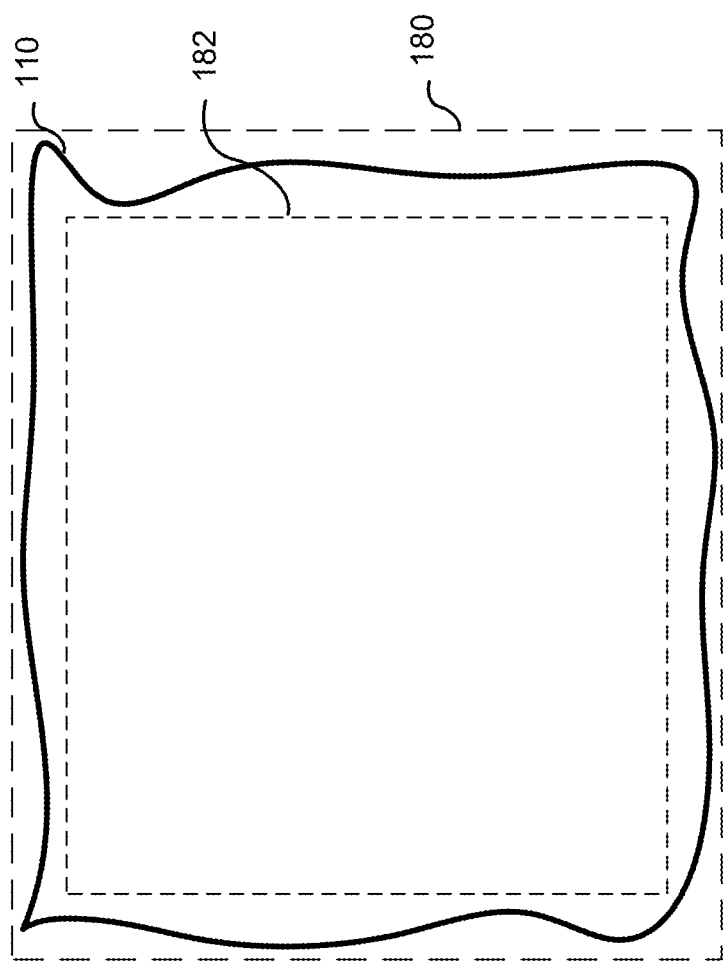
FIG. 10 shows a schematic of bounding and inset rectangles to determine if an object is cuboidal.

FIG. 10 shows a schematic of bounding and inset rectangles to determine if an object is cuboidal. After the bounding rectangle 180 is calculated as described above, an inset rectangle 182 is calculated as being a rectangle offset inwards by a certain amount from the bounding rectangle 180.

The purpose of the inset rectangle 182 is twofold. First, it provides a baseline for what is considered a cuboidal object. If an edge of the object 110 intersects an edge of the inset rectangle 182, the object 110 is not cuboidal. Second, the inset rectangle 182 provides some parameters on how to calculate the average edge lengths, which may be beneficial if the object 110 is indeed not cuboidal.

The amount of offset to use is configurable in the software. In general, as larger objects tend to be less cuboidal, the system is normally configured to increase the inset rectangle offset as an object size increases.

To test if an object is a cuboid, a traversal algorithm traverses each point on the line segments comprising the inset rectangle 182 and retrieves the corresponding 3D point from the point cloud 170. The height (Z component) of each 3D point is stored. The minimum, maximum and average heights are stored.

Figure 11:
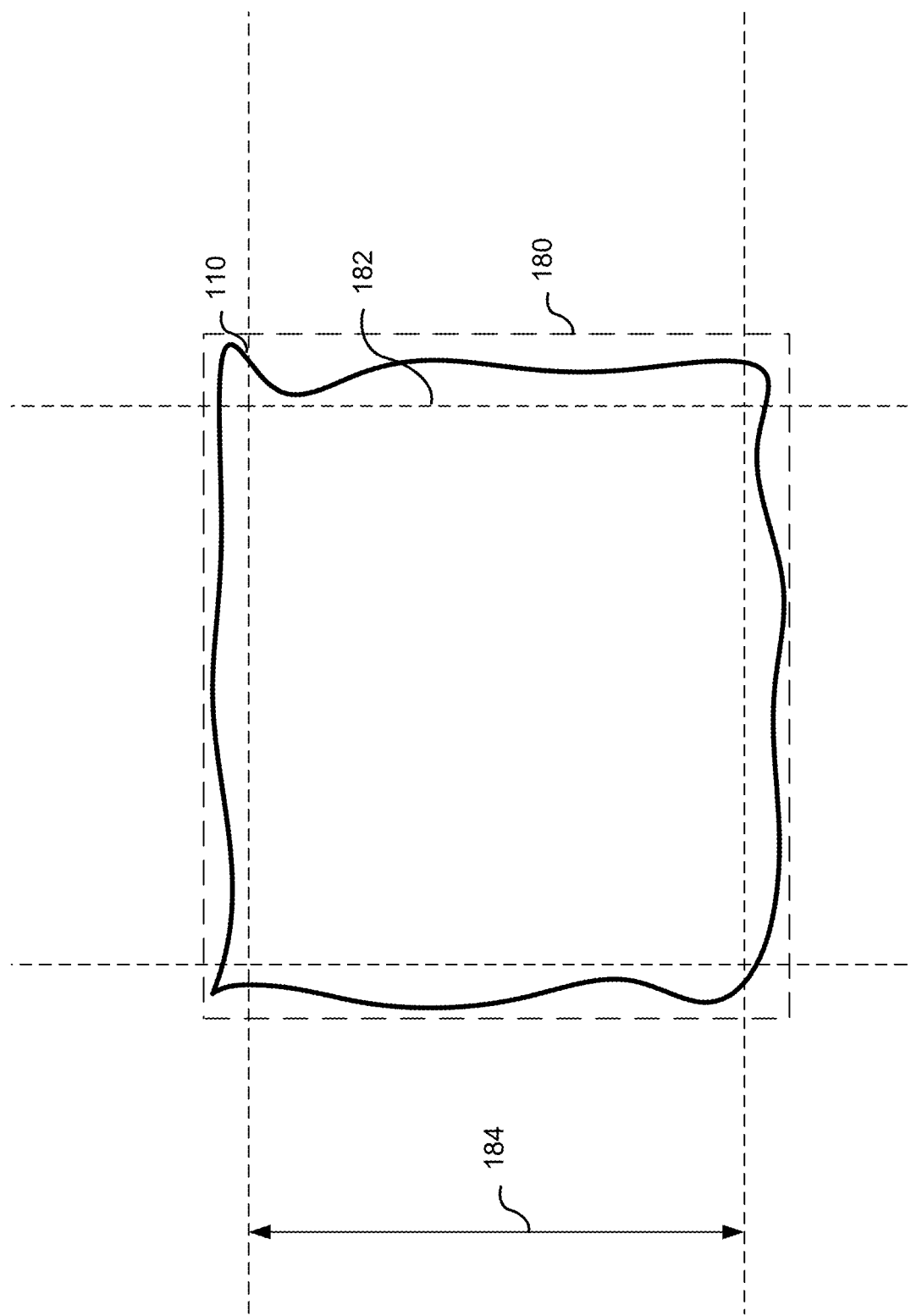
FIG. 11 shows average edge widths for determining the dimensions of an object.

In short, if the delta, or difference, between the minimum and maximum heights are greater than a certain threshold, the object 110 is not cuboidal. The threshold is configurable and can scale dynamically based on an objects size. In these cases, it may be better to determine the volume of the object based on average dimensions instead of the maximum dimensions described previously. FIG. 11 shows average edge widths for determining the dimensions of the object. To calculate average width of an object 110, a traversal algorithm iterates each row of the depth frame included in the inset rectangle 182 and calculates the width 184 of that row. Once completed, the average width is calculated and returned. The process is then repeated for the other edge dimension.

It is important to note that the above methods for determining the edge lengths and height of the object may be performed in both a single camera setup (as shown in FIG. 1, for example), or a multi-camera setup (as shown in FIG. 3, for example). This is because determining the dimensions is achieved using the point cloud, which can be obtained using either setup as described above.

Figure 12:
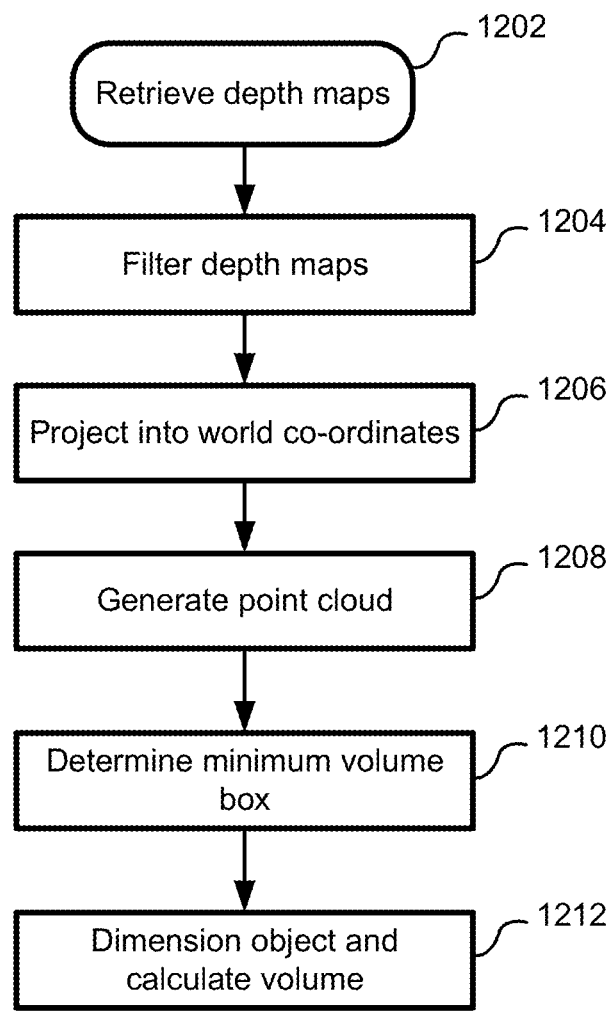
FIG. 12 depicts a method flow for dimensioning an object using single or multi-imaging device configurations.

FIG. 12 depicts a method flow 1200 for dimensioning an object using single or multi-imaging device configurations. The method flow starts by retrieving a plurality of depth maps of an object placed on a dimensioning surface (1202). These depth maps could be retrieved from a single imaging device or from a plurality of imaging devices. The depth maps are retrieved by a camera control computer, and may then be sent to a host control computer, especially in the multi-imaging device scenario. A filter is applied to the depth maps (1204) to smooth out grainy outliers in each of the plurality of depth maps. This may be achieved by a Median filter, for example. The depth maps received from each of the one or more imaging devices are transformed into a world co-ordinate system (1206) as each imaging device may be oriented at an angle relative to the object being imaged, in a space local to the individual imaging device. Therefore to combine the depth maps they must first be transformed into a common co-ordinate system. This transformation may be achieved based on a calibration of the imaging devices. Once the transformation of the depth maps has occurred, a point cloud image of the object to be dimensioned may be generated (1208). Then, as previously described, the software can determine a minimum volume box (1210) and dimension the object (1214) using the edge lengths and height of the minimum volume box. This allows for a volume of the box to be calculated.

Figure 13:
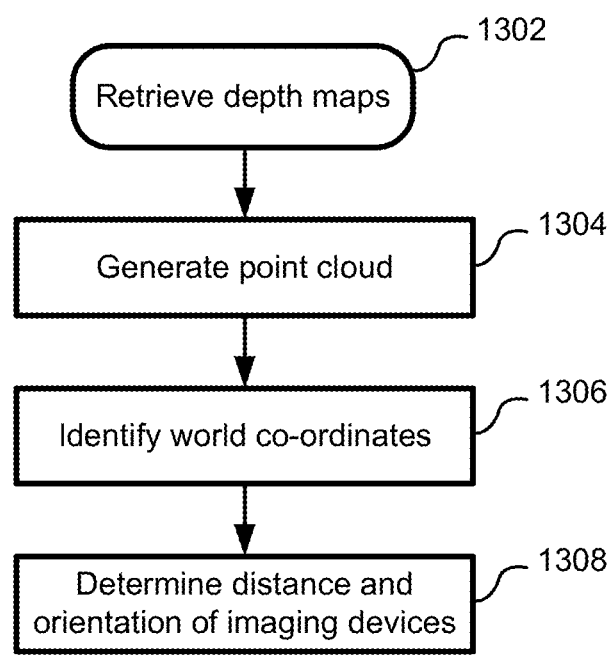
FIG. 13 depicts a method flow for calibrating an imaging device prior to dimensioning an object.

FIG. 13 depicts a method flow 1300 for calibrating an imaging device prior to dimensioning an object. The method flow begins by retrieving a plurality of depth maps from one or more imaging devices (1302). These depth maps would be taken prior to the object being placed on the dimensioning surface, and may include a calibration tool to assist with calibration as previously discussed. A point cloud is generated for each of the one or more imaging devices (1304). The point cloud is then used to identify world co-ordinates (1306), which is achieved by identifying the planes defining the world axes using a RANSAC algorithm as previously described. The calibration tool is used to assist with identifying these planes. For each imaging device the distance and orientation of each of the one or more depth-sensing imaging devices is determined to transform a depth map taken in a local imaging device space of the one or more depth-sensing imaging devices to the world co-ordinate system (1308). In the case of just a single imaging device setup, it may be possible for the local imaging device space to be the same as the world co-ordinate system, in which case no transformation would be necessary. The dimensioning surface may be a dedicated surface or defined area underneath the imaging devices. Alternatively the dimensioning surface may be defined by a pallet containing the objects which can be transported by a fork lift where the calibration is performed relative to a pallet surface.

Figure 14:
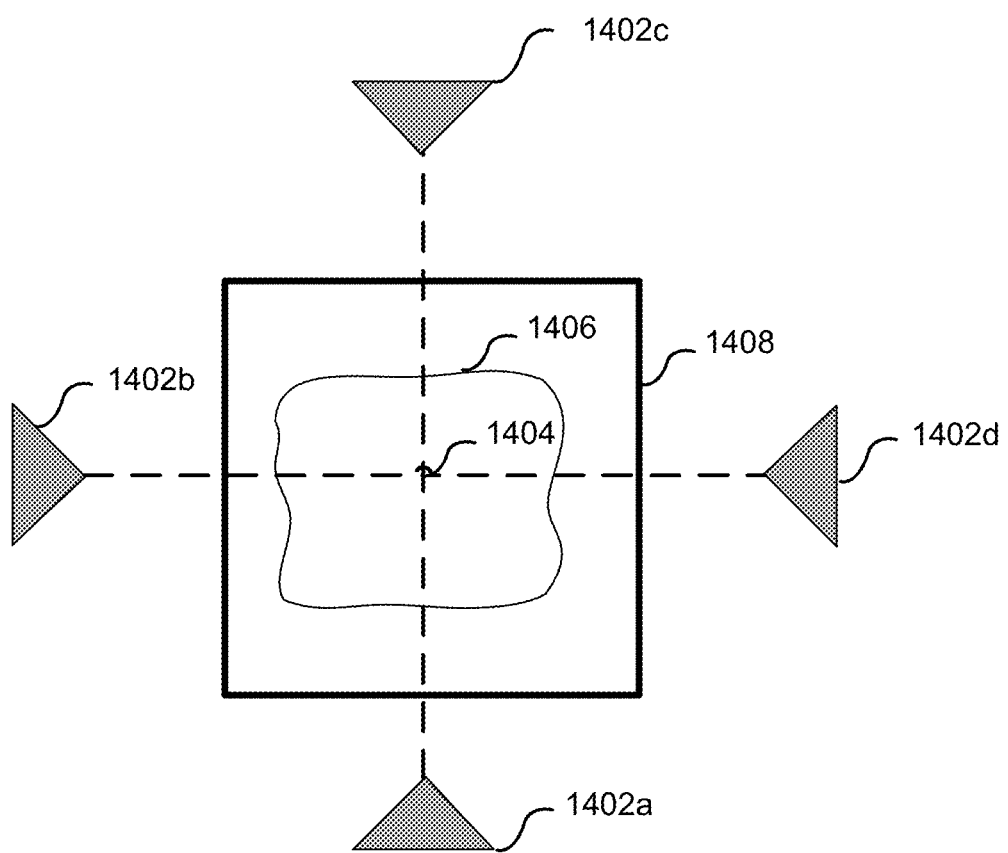
FIG. 14 shows a top view of multi-imaging device configuration.

FIG. 14 shows a top view of multi-imaging device configuration 1400. A multiple sensor setup where 4 cameras, 1402a, 1402b, 1402c, 1402d are mounted at orientations that surround the object 1406 to be dimensioned may be considered. The cameras 1402a, 1402b, 1402c, 1402d are positioned at equal distance from the center (origin) 1404 and above the dimensioning surface 1408. The object such as a package or palate is placed on the dimensioning surface

1408 and measurement of the object is performed by the cameras and dimensions are determined by the control computer. The dimensions can then be associated with the package.

Figure 15:
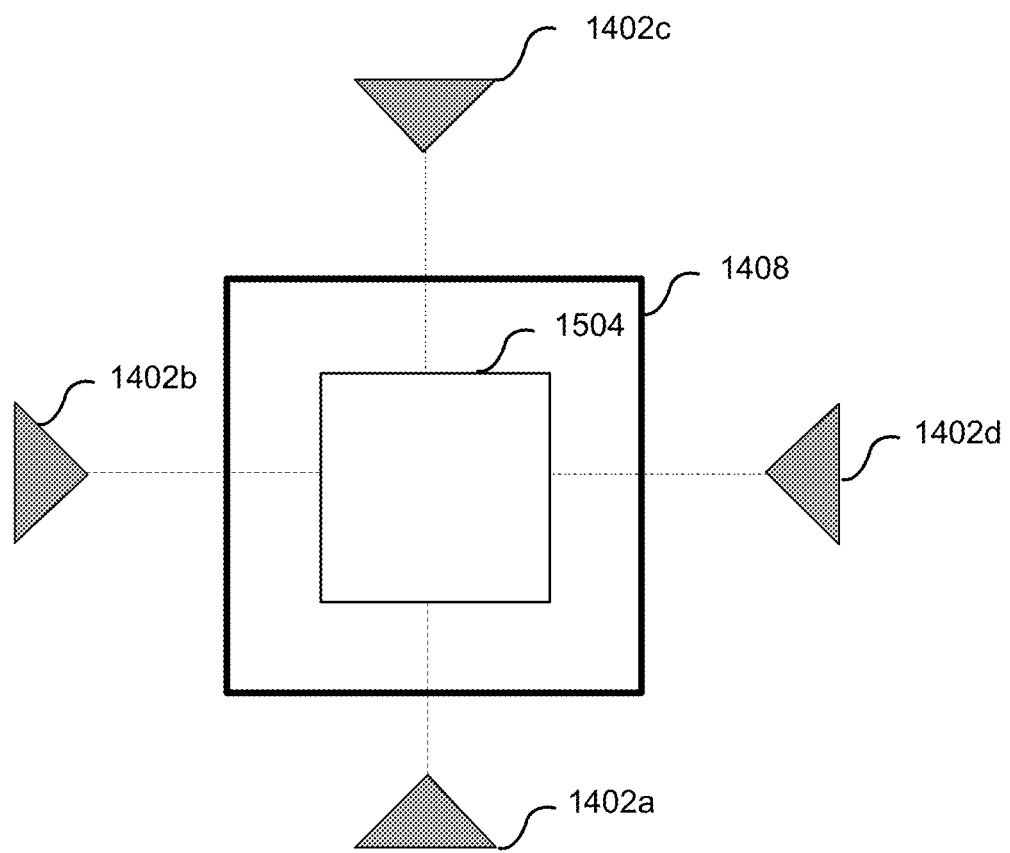
FIG. 15 shows an embodiment for a calibration setup for a tetrad imaging device configuration.

FIG. 15 illustrates an embodiment for a calibration setup for a tetrad imaging device configuration 1500. The four sensors 1402a-1402d are mounted overhead of the dimensioning surface 1408 and positioned at equal distance from the center point. The cameras are oriented to aim directly at the centre of the dimensioning surface. In a tetrad-sensor configuration, the depth map from each camera 1402a-1402d will be combined in by the host control computer 201 to form a combined point cloud. This necessitates that a multiple coordinate system is utilized. The control computer 201 attached to each respective camera 1402a-1402d will process camera data according to local camera space coordinates, but the host control computer 201 that combines data from all cameras 1402a-1402d must transform each camera's depth map to a world coordinate system. From that point the dimensioning host control computer 201 calculates dimensions from the point cloud similarly to the way it works with a single camera setup.

From a calibration perspective, each camera 1402a-1402d must be calibrated such that the software is aware of its exact orientation in 3D space (in a world co-ordinate system) relative to the other cameras. The calibration procedure works by having the control computer activate the camera, capture a series of depth maps and within them identify specific edges on a test box 1504 using an implementation of the Random sample consensus (RANSAC) algorithm. The system automatically detects bias from the expected computed data and corrects it calibration parameters. Furthermore, the shape and position of the test box are chosen such that that impact of the bias on each parameter can be observed independently. The test box is perfectly cuboidal with each vertical surface facing one sensor with an orthogonal incidence angle when 2D horizontally projected to the ground. Each sensor is able to detect these edges and based on the angles it can then determine its own position relative to the test box. A space transform equation is computed for each edge identified. The host computer utilizes the information from each sensor in order to understand how to transform the point cloud it receives from Provided the calibration tool was oriented to the world-space axes, the software can now determine the distance and orientation of each camera. When all cameras 1402a-1402d are correctly calibrated the dimensioning software is be able to construct a single point cloud from each of the camera depth maps. In other words, the software can retrieve a depth map taken in a local imaging device space of an imaging camera, and based on the calibration transform the depth map into the world co-ordinate system so that the multiple depth maps from the four cameras can be properly aligned.

Figure 16:
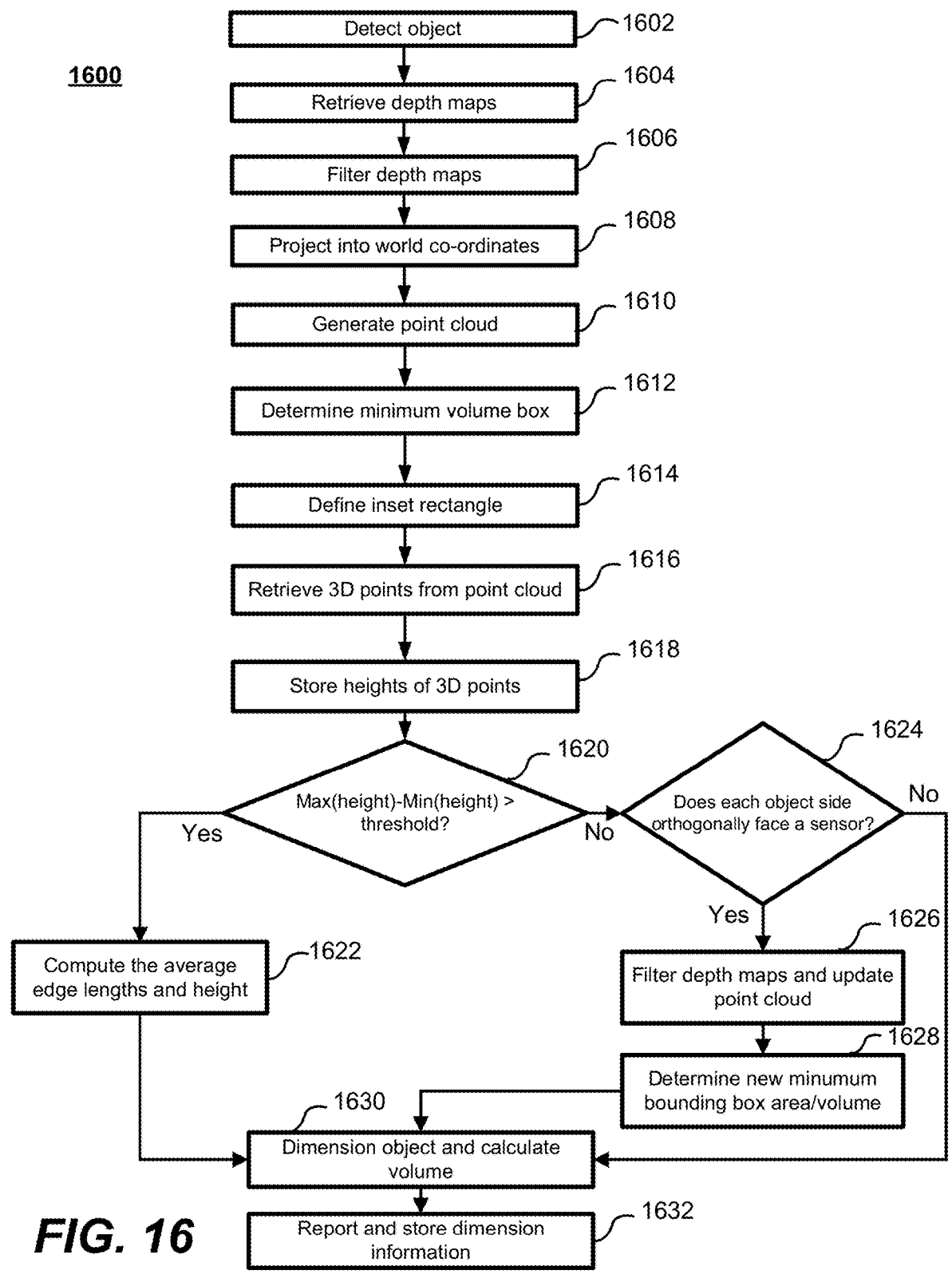
FIG. 16 shows a method flow for dimensioning an object using four imaging devices.

FIG. 16 depicts a method flow 1600 for dimensioning an object using four imaging devices. The method flow starts by detecting if an object is positioned on the dimensioning surface (1602). The depth maps for each sensor are retrieved by a camera control computer (1604), and may then be sent to a host control computer.

A filter is applied to the depth maps (1606) to smooth out grainy outliers in each of the plurality of depth maps. This may be achieved by a median filter or kNN filter, for example. In addition to noise filtering techniques, deviations across sensors are mitigated using the following techniques. For each sensor, the data obtained in the opposite half of the reference space (across the origin) may be discarded since better quality data is available for this area from the sensor located diagonally opposite. In addition, depth sensors have shown a non-linearity behaviour when scanning surfaces with incidence angles over 105 degrees. In cases where there is overlapping data amongst multiple sensors, the sensor with the best incident angle may be automatically selected as premium data if the other sensors are positioned with a problematic incidence relative to the area being scanned. Furthermore, in areas where data from multiple sources are available, and there is no problematic incidence, the distance to each sensor is computed and only the data from the closest source is kept.

The depth maps received from each imaging device are transformed into a world co-ordinate system (1608) as each imaging device may be oriented at an angle relative to the object being imaged, in a space local to the individual imaging device. Therefore to combine the depth maps they must first be transformed into a common co-ordinate system. This transformation may be achieved based on a calibration of the imaging devices. Once the transformation of the depth maps has occurred, a point cloud image of the object to be dimensioned may be generated (1610).

Then, as previously described, the software can determine a minimum bounding box area (1612). Once the minimum bounding box area is calculated, an inset rectangle may be calculated as being a rectangle offset inwards by a defined amount from the minimum bounding box (1614). A transversal algorithm transverses each point on the line segments comprising the inset rectangle 182 and retrieves the corresponding 3D point from the point cloud (1616). The height of each 3D point may be stored (1618). A determination is made to see if the difference between the minimum height and maximum height stored is greater than a defined threshold (1620). If the difference between the minimum height and maximum height stored is greater than the threshold (yes at 1620), the object is not cuboidal, and the average edge lengths are computed using a transversal algorithm (1622). Using the average height and average edge lengths, the volume can be determined (1630). If the difference between the minimum height and maximum height stored is not greater than the threshold (no at 1620), a further determination is made to see if the objects sides face a sensor with an orthogonal angle of incidence when 2D horizontally projected (1624). The implementation of the RANSAC algorithm can be used to determine the angle of incidence of an objects face relative to a sensor.

If the objects sides face a sensor with an orthogonal angle of incidence when 2D horizontally projected (yes at 1624), then the depth map for each sensor is filtered by discarding data of the sides that said sensor does not orthogonally face. The point cloud is regenerated based on the updated depth maps (1626). An updated minimum volume box may be recalculated using the updated point cloud (1628).

Figure 17:
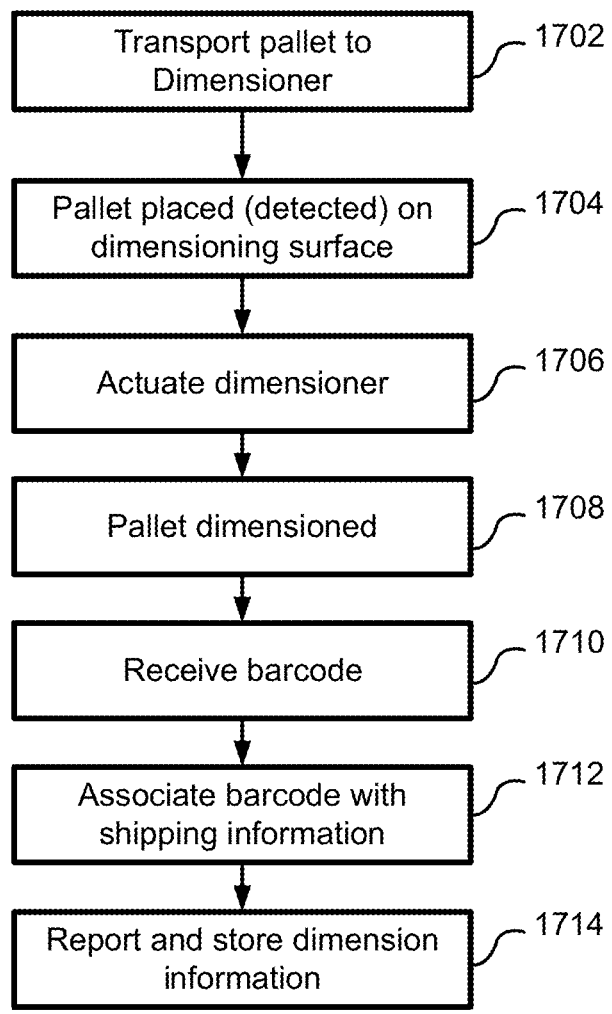
FIG. 17 shows a method flow for the input steps required by the user to operate the dimensioner.

If the objects sides do not face a sensor with an orthogonal angle of incidence when 2D horizontally projected (no at 1624), the dimensions and volume of the object may be determined based on the initial minimum volume box tabulated (1630). Using the minimum volume box and the average height stored the dimensions of the object may be calculated (1630) and provided to the user (1632). FIG. 17 depicts a method flow 1700 for the input steps required by the user to operate the dimensioner. The method begins by transporting the object to the dimensioner 1702. The object is to be placed at the origin point of the dimensioning surface (1704) beneath the four imaging sensor. If the object is cuboidal, the object is to be positioned with each side facing a sensor with an orthogonal angle of incidence when 2D horizontally projected. The dimensioner is actuated by the instruction of the user via a display interface and when the sensors and/or scale detect an object is located on the dimensioning surface (1706). The object is dimensioned by the dimensioner (1708). A barcode, shipping label, or other identification system providing unique identification of the object may be scanned (1710). The information from scanning the barcode provides information and shipping requirements associated with the object (1712). Other identification methods such as RFID may be used to identify the object. An RFID tag may be attached to the object and a RFID passive or active reader placed in proximity to the dimensioning system. The dimensioning information can then bet utilized in determining transportation parameters of the object. The system can generate a report that provides information regarding the dimensions of the object and shipping information (1714). The report can be displayed on the user interface and stored in a database located on a network.

Figure 18:
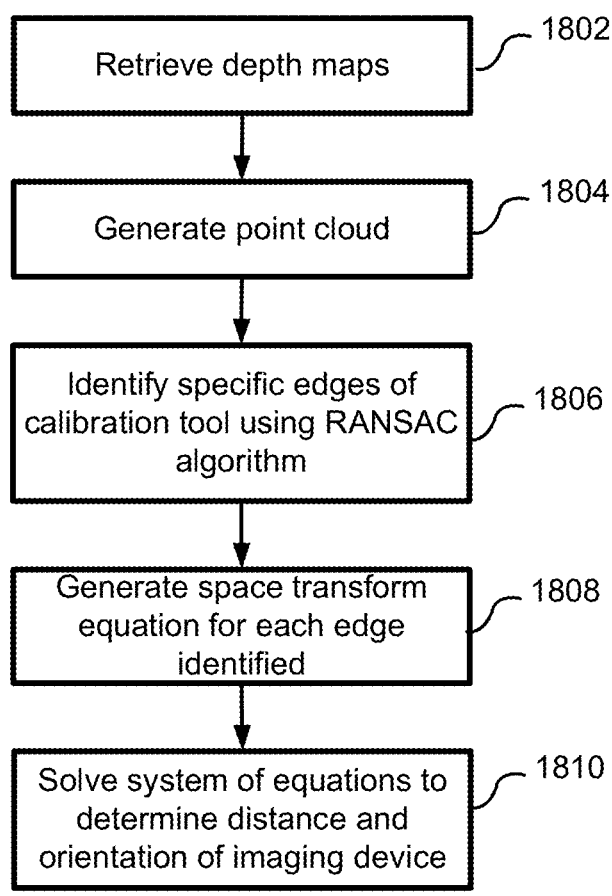
FIG. 18 shows a method flow for calibrating an imaging device prior to dimensioning an object.

FIG. 18 depicts a method flow 1800 for calibrating an imaging device prior to dimensioning an object. These operations are performed independently for each sensor. The method flow begins by retrieving a plurality of depth maps from the device (1802). These depth maps would be taken prior to the object being placed on the dimensioning surface, and include a calibration tool to assist. A point cloud is generated for the imaging device (1804). The point cloud is then used to identify world co-ordinates, which is achieved by identifying specific edges of a known test box (1806). The system's calibration is necessary to locate each sensor in a shared 3D space, called reference space (world coordinate system). An implementation of the RANSAC algorithm is used to identify specific edges of the test box. The center of the specific edges define the origin of the reference space. For each identified edge, a space transform equation (1) is generated (1808).

$$M_{R \to K} = T_{R \to K} \cdot R_z\left(\frac{\pi}{2} + x\right) \cdot R_x\left(\frac{\pi}{2} + \beta\right) \cdot R_g(\gamma) \quad (1)$$

The location details (x, y, z coordinates and yaw, pitch, roll angles) are then used to project the point cloud of each sensor from their own 3D space to the reference space K to determine translations along axis x, y, z, and rotations yaw (a), pitch (β), roll (γ). M is the space transform matrix applicable to move a 3D vector between the Kinect space (K) and reference space (R). T is a 3D translation matrix and R a 3D rotation matrix along the axis specified as indice.

The space transform equation (1) is computed for each edge. The coordinates of the edges are known in the reference space and parameterized in the system, and their coordinates in the sensors space are measured through the scan. This builds a non-linear system of equations expressing the 3D coordinates of the calibration points (specific edges) in each sensor's own 3D space. This system of equations is solved using mathematical heuristics until a linear system of equations is reached, which can be solved programmatically. From solving the system of linear equations, the distance and orientation of the sensor in the reference space is determined (1810).

For pallets that are scanned after the initial calibration, the system merges inputs from the 4 sensors to capture a full 3D point cloud of the pallet/object scanned. The point clouds (depth scan data) from the four sensors are acquired in parallel and merged in a single shared reference space.

Each element in the embodiments of the present disclosure may be implemented as hardware, software/program, or any combination thereof. Software codes, either in its entirety or a part thereof, may be stored in a computer readable medium or memory (e.g., as a ROM, for example a non-volatile memory such as flash memory, CD ROM, DVD ROM, Blu-ray™, a semiconductor ROM, USB, ora magnetic recording medium, for example a hard disk). The program may be in the form of source code, object code, a code intermediate source and object code such as partially compiled form, or in any other form.

It would be appreciated by one of ordinary skill in the art that the system and components shown in FIGS. 1-18 may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as defined in the claims.

The invention claimed is:

1. A method of dimensioning an pallet for determining shipping volumes, the method comprising:
   retrieving a plurality of depth maps of an pallet placed on a dimensioning surface from a plurality of depth-sensing imaging devices;
   filtering each of the plurality of depth maps retrieved from the plurality of depth-sensing imaging devices;
   transforming each depth map into a world co-ordinate system in three dimensional space utilizing calibration parameters of each of the one or more depth-sensing imaging devices;
   generating a point cloud representing the object to be dimensioned using the transformation of the plurality of depth maps;
   determining edge lengths of the pallet;
   determining a height of the pallet; and
   calculating a volume of the pallet;
   wherein determining the edge lengths comprises:
      translating the point cloud to be at a center of the world co-ordinate system;
      rotating, about a center of the point cloud, 90 degrees in rotation angles of one degree around a vertical axis of the world co-ordinate system;
      calculating, at each rotation angle, a bounding box aligned with axes in the world co-ordinate system;
      calculating, at each rotation angle, an area of a front face of the bounding box, the front face being an upper surface of the object;
      determining a minimum calculated area of the front face of the bounding box representing a bounding rectangle and a rotation angle associated with the bounding rectangle; and
      determining a length and a width of the bounding rectangle, representing a maximum length and a maximum width of the object.

2. The method of claim 1, wherein the depth-sensing imaging devices are one of: ranging, infrared laser and CMOS sensor, flash lidar, time-of-flight, or RGB-D cameras.

3. The method of claim 1, wherein the filtering is performed by using a Median or a kNN approach filter to smooth out grainy outliers in each of the plurality of depth maps.

4. The method of claim 1, wherein the calibration of the one or more depth-sensing imaging devices is performed prior to placing the object on the dimensioning surface, the calibration comprising:

retrieving from one or more depth-sensing imaging devices a plurality of depth maps of a dimensioning surface;

generating, a point cloud using the depth maps from each of the one or more depth-sensing imaging devices;

identifying world co-ordinates in the point clouds taken from each of the one or more depth-sensing imaging devices; and determining, a distance and orientation of each of the one or more depth-sensing imaging devices to transform a depth map taken in a local imaging device space of the one or more depth-sensing imaging devices to the world co-ordinate system.

5. The method of claim 4, wherein a calibration tool having intersecting planes is placed perpendicular to the dimensioning surface, and wherein an intersection of two planes of the calibration tool represents an origin (X,Y,Z)= (0,0,0) in the world co-ordinate system, where X, Y, and Z are axes in the world co-ordinate system.

6. The method of claim 5, wherein world co-ordinates are identified in the depth maps by identifying the intersecting planes, the planes intersecting at right angles and form a plus or cross shape.

7. The method of claim 6, wherein the intersecting planes are identified using a Random Sample Consensus (RANSAC) algorithm.

8. The method of claim 1, further comprising:
applying a bounding volume to each of the plurality of depth maps retrieved, the bounding volume defining a three dimensional hexahedron aligned to the world co-ordinate system and representing an allowable space for points of a depth map to be considered for dimensioning.

9. The method of claim 8, wherein the bounding volume is set to be just above the dimensioning surface to exclude any points residing on the surface itself.

10. The method of claim 1, further comprising determining if the object is cuboidal, wherein determining if the object is cuboidal comprises:
determining an inset rectangle offset by a pre-determined amount inward from the bounding rectangle;
traversing each point of the inset rectangle and retrieving a corresponding point from the point cloud;
storing a determined height of the corresponding point;
determining a minimum, maximum, and average of the height of the corresponding point for each point of the inset rectangle; and
calculating a difference between the minimum and maximum height.

11. The method of claim 10, wherein the object is not cuboidal if the difference between the minimum and maximum height is greater than a pre-selected threshold, and if the object is not cuboidal, the method further comprising determining an average length and an average width of the object.

12. The method of claim 11 wherein determining the average length and the average width of the object comprises:
iterating each row of the depth map included in the inset rectangle;
calculating a length and a width of each row;
calculating average length and average width based on length and width of each row.

13. The method of claim 1, wherein determining the height of the object comprises:
determining a first vertical distance from a point in a vertical axis of the world co-ordinate system to the dimensioning surface;
determining a second vertical distance from the point in the vertical axis of the world co-ordinate system to a front face of the object; and
calculating a difference between the first vertical difference and the second vertical distance.

14. The method of claim 13, wherein the point in the vertical axis of the world co-ordinate system is a depth-sensing imaging device in a single depth-sensing imaging device setup.

15. The method of claim 1, wherein for a single imaging device setup the imaging devices is mounted overhead of the object and aimed at a center of the dimensioning surface, an angle between a vector from the imaging device lens to the center of the dimensioning surface and a plane normal to the dimensioning surface less than 1 degree.

16. The method of claim 1, wherein for a tetrad imaging device setup the imaging devices are mounted overhead of the object and positioned at equal distance from a center of the dimensioning surface.

17. The method of claim 16, if the object is cuboidal and each vertical surface faces a sensor with an orthogonal angle of incidence when horizontally projected, then the depth map for each sensor is filtered by discarding data of the sides that said sensor does not orthogonally face.

18. The method of claim 17 further comprising applying a bounding volume to each of the plurality of depth maps retrieved, the bounding volume defining a three dimensional hexahedron aligned to the world co-ordinate system and representing an allowable space for points of a depth map to be considered for dimensioning.

* * * * *